Nov. 23, 1943.                C. R. NALLE                2,335,074
                            ADJUSTABLE CASTER
                           Filed March 21, 1942
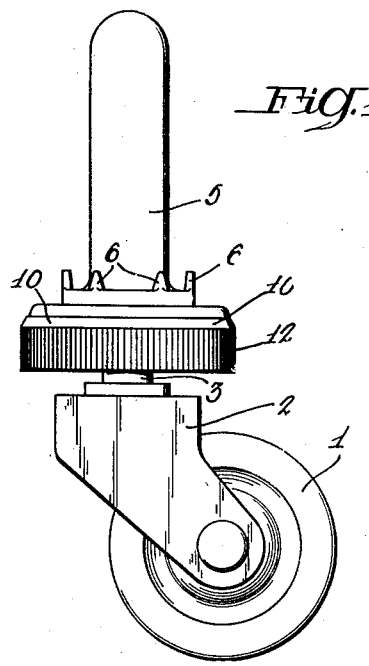
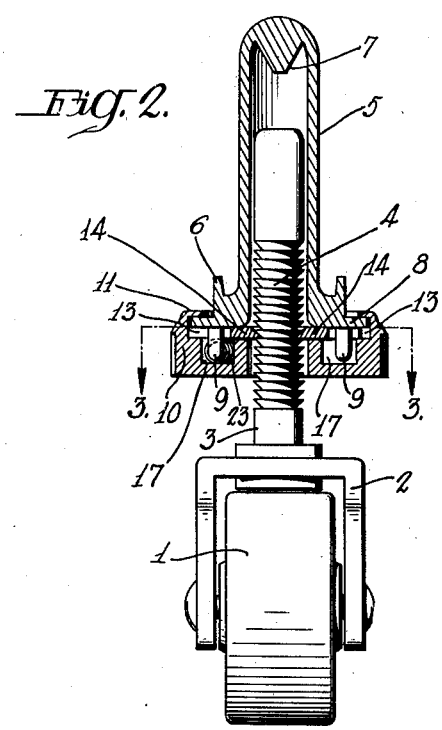
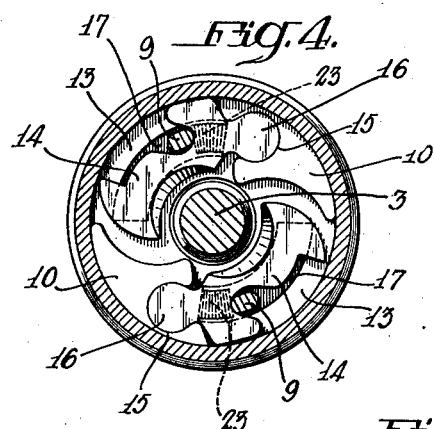
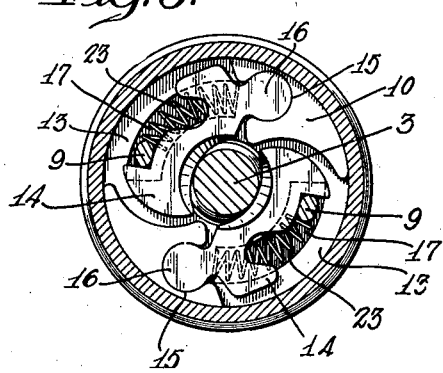
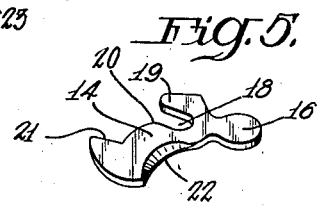
Inventor:-
Charles R. Nalle
by his Attorneys
Howson & Howson Patented Nov. 23, 1943

2,335,074

UNITED STATES PATENT OFFICE 2,335,074

ADJUSTABLE CASTER

Charles R. Nalle, Philadelphia, Pa.

Application March 21, 1942, Serial No. 435,676

11 Claims. (Cl. 16—19)

This invention relates to adjustable casters and more particularly to that type of caster employing a stem or shank with successive annular grooves, and embodying means interlockable with said grooves to effect adjustment of the caster. The present invention is in the nature of an improvement over the structures shown in my prior Patents Nos. 1,500,465 and 1,879,421.

The principal object of the invention is to provide an improved caster of this type which is simple in construction, capable of economic manufacture, and highly efficient in operation.

A more specific object of the invention is to provide a caster of this type comprising a pair of relatively movable adjustment members, locking dogs pivotally carried by one of said members and having cam portions, and means on the other of said members engageable with said cam portions for actuating the locking dogs into locking or non-locking positions.

A further object of the invention is to provide a caster of this character in which the parts may be readily manufactured and assembled, and the locking dogs are of simple form and may be stamped from flat sheet material.

Other objects and features of the invention will appear hereinafter.

In the accompanying drawing:

Fig. 1 is an elevational view of a caster constructed in accordance with the invention;

Fig. 2 is a part section and part elevational view of the caster;

Fig. 3 is a sectional view taken along line 3—3 of Fig. 2;

Fig. 4 is a similar view showing the parts in non-locked position for adjustment; and Fig. 5 is a perspective view of one of the locking dogs.

Referring first to Figs. 1 and 2, there is shown a caster of the wheel type in which a wheel 1 is rotatably carried by a yoke 2 to which a stem or shank 3 is attached. It will be understood, of course, that the invention is equally applicable to other types of devices of like nature, such as the simple support type caster in which a glide or simple support member is employed instead of a wheel. The shank 3 is provided with a plurality of annular grooves 4, the number of grooves being sufficient to provide the desired range of vertical adjustment.

The support member 5, which serves to support an object such as the leg of an article of furniture, is of tubular form to receive the shank 3 and is provided with teeth or projections 6 for firm engagement with the supported object. Preferably, the member 5 is formed as a die casting with its upper end completely closed and has a projecting stop portion 7 engageable by the end of shank 3 to limit the adjustment in one direction. Member 5 is also provided with a flange 8 at its lower end and has a pair of downwardly extending projections 9 for a purpose to be described presently.

An adjusting disk 10 is rotatably carried by the support member 5 and, to this end, the disk is provided with an inwardly extending flange 11 by which it is rotatably suspended on flange 8. The peripheral wall of disk 10 is provided with knurling 12 to facilitate manual rotation of the disk.

As shown more clearly in Figs. 3 and 4, the disk 10 has shallow recesses 13 to accommodate locking dogs 14. The shallow recesses 13 have circular portions 15 to receive corresponding portions 16 of the locking dogs, one of which is clearly shown in Fig. 5. The dogs are free of attachment to disk 10 with their circular portions 16 seated in the complementary recesses 15. As shown in Figs. 3 and 4, this construction permits limited pivotal movement of the dogs into locking and non-locking positions, the portions 16 rotating slightly in recesses 15 during such movement.

The disk 10 is also provided with relatively deep arcuate slots 17 beneath the plane of dogs 14. Each of the locking dogs has a slot or recess 18 through which one of the projections 9 extends. As shown in Fig. 2, the projections 9 extend into the arcuate slots 17. On each dog, there are also provided cam portions 19 and 20 on opposite sides of the recess 18, a shoulder 21, and a tapered edge 22, all as clearly shown in Fig. 5. The cam portion 19 is so formed that when it is engaged by the associated projection 9 the dog is moved outwardly, while cam portion 20 is so formed that when it is engaged by the projection 9 the dog is moved inwardly. Within the arcuate slots 17 there are disposed helical springs 23, as shown more clearly in Fig. 3. One end of each spring engages the associated projection 9 while the opposite end of the spring engages an end wall of the slot 17 in which it is seated.

Assuming that the caster is in use and that the support member 5 is fixedly engaged with the object being supported, it will be seen that the springs 23 urge the disk 10 clockwise, as viewed in Fig. 3 so that the projections 9 are engaged with the cam portions 20 and the locking dogs are disposed inwardly in locking relation with one of the grooves 4 on the shank 3, the tapered edges 22 of the dogs engaging the said groove. The shoulders 21 on the dogs engage projections 9 to limit the movement of disk 10 in such direction.

When it is desired to adjust the caster, disk 10 is rotated counterclockwise, as viewed in Fig. 3, against the action of springs 23. Such rotation brings the cam portion 19 of each dog into engagement with the associated projection 9, which effects pivotal movement of the dogs outwardly into non-locking position, as shown in Fig. 4. The shank 3 may then be adjusted vertically while holding the disk 10 in the non-locking position. When the desired adjustment has been effected, the disk 10 is released and the springs cause clockwise rotation of the disk. This brings the cam portions 20 of the dogs into engagement with the projections 9, returning the dogs to their inner locking positions, as shown in Fig 3.

From the foregoing description, it will be seen that the invention provides a novel structure, the parts of which may be easily and economically manufactured and may be easily assembled. The support member 5 may be formed as a single element. The locking dogs are of extremely simple construction and may be formed by a simple stamping operation. Moreover, the specific arrangement for pivotal mounting of the dogs free of attachment to the disk 10 enables easy assembly of the device. Compared to the devices of my above-mentioned patents, the present device requires fewer parts, is simpler in construction, is easier to assemble, and is cheaper to construct.

It will be understood, of course, that the invention is not limited to the specific structure shown but is capable of various modifications. Furthermore, as mentioned previously, the invention is applicable to any type of adjustable device for supporting objects such as articles of furniture.

I claim:

1. In an adjustable caster, the combination with a shank having grooves therein, of a pair of relatively movable cooperative members, locking dogs pivotally carried by one of said members and adapted to engage the grooves of said shank, projections on the other of said members cooperatively associated with said dogs, cam means on said dogs engageable by said projections to move the dogs into and out of engagement with said grooves in response to relative movement of said members, and spring means normally maintaining said members in such relative positions that the dogs are engaged with said grooves.

2. In an adjustable caster, the combination with a shank having grooves therein, of a pair of relatively movable cooperative members, one of said members having recesses and arcuate slots therein, locking dogs having pivot portions removably seated in said recesses, whereby the dogs are pivotally carried by said one member, said dogs having edge portions adapted to engage the grooves of said shank, projections on the other of said members extending into said slots, and cam means on said dogs engageable by said projections to move the dogs into and out of engagement with said grooves in response to relative movement of said members.

3. In an adjustable caster, the combination with a shank having grooves therein, of a pair of relatively movable cooperative members, one of said members having recesses and arcuate slots therein, locking dogs having pivot portions removably seated in said recesses, whereby the dogs are pivotally carried by said one member, said dogs having edge portions adapted to engage the grooves of said shank, projections on the other of said members extending into said slots, cam means on said dogs engageable by said projections to move the dogs into and out of engagement with said grooves in response to relative movement of said members, and a coil spring in each of said slots between the projection therein and an end wall of the slot, for urging said members into such relative positions that the dogs are engaged with said grooves.

4. In an adjustable caster, an upstanding shank having grooves therein, a weight supporting member slidably associated with said shank, a rotatable member carried by said first member, locking dogs pivotally carried by said rotatable member and adapted to engage the grooves of said shank to lock said first member and said shank in various positions of adjustment, and means on said first member for actuating said dogs in response to rotation of said rotatable member, thereby to move the dogs to non-locking position and permit relative adjustment of said first member and said shank.

5. In an adjustable caster, an upstanding shank having grooves therein, a weight supporting member slidably associated with said shank, a rotatable member carried by said first member, locking dogs pivotally carried by said rotatable member and adapted to engage the grooves of said shank to lock said first member and said shank in various positions of adjustment, and cooperative means on said first member and said dogs for moving the dogs into and out of engagement with said grooves upon rotation of said rotatable member, thereby to permit relative adjustment of said first member and said shank.

6. In an adjustable caster, an upstanding shank having grooves therein, a weight supporting member slidably associated with said shank, a rotatable member carried by said first member, locking dogs pivotally carried by said rotatable member and adapted to engage the grooves of said shank to lock said first member and said shank in various positions of adjustment, projections on said first member cooperatively associated with said dogs, and cam means on said dogs engageable by said projections to move the dogs into and out of engagement with said grooves upon rotation of said rotatable member, thereby to permit relative adjustment of said first member and said shank.

7. In an adjustable caster, an upstanding shank having grooves therein, a weight supporting member slidably associated with said shank, a rotatable member carried by said first member, locking dogs pivotally carried by said rotatable member and adapted to engage the grooves of said shank to lock said first member and said shank in various positions of adjustment, projections on said first member cooperatively associated with said dogs, cam means on said dogs engageable by said projections to move the dogs into and out of engagement with said grooves upon rotation of said rotatable member, thereby to permit relative adjustment of said first member, and spring means normally maintaining said rotatable member in a position to engage said dogs with said grooves.

8. In an adjustable caster, an upstanding shank having grooves therein, a weight supporting member slidably associated with said shank, a rotatable member carried by said first member and having arcuate slots therein, locking dogs pivotally carried by said rotatable member and adapted to engage the grooves of said shank to lock said first member and said shank in various positions of adjustment, projections on said first member extending into said slots and movable therein, cam means on said dogs engageable by said projections to move the dogs into and out of engagement with said grooves upon rotation of said rotatable member, thereby to permit relative adjustment of said first member and said shank, and springs disposed in said slots and arranged to urge said rotatable member in a direction to effect engagement of said dogs with said grooves.

9. In an adjustable caster, an upstanding shank having grooves therein, a weight supporting member slidably associated with said shank, a rotatable member carried by said first member, locking dogs pivotally carried by said rotatable member and adapted to engage the grooves of said shank to lock said first member and said shank in various positions of adjustment, said rotatable member having slots therein concentric with said shank and underlying said dogs, projections on said first member extendng into said slots, springs in said slots urging said rotatable member to normal position relative to said first member, and cam means on said dogs engageable by said projections to effect engagement of the dogs when said rotatable member is in its normal position and to effect disengagement of the dogs when said rotatable member is rotated from said position.

10. In an adjustable caster, an upstanding shank having grooves therein, a weight supporting member slidably associated with said shank, a rotatable member carried by said first member, locking dogs pivotally carried by said rotatable member and adapted to engage the grooves of said shank to lock said first member and said shank in various positions of adjustment, said rotatable member having recessed portions to receive said dogs and having relatively deep slots in said portions concentric with said shank and underlying said dogs, projections on said first member extending into said slots, springs in said slots urging said rotatable member to normal position relative to said first member, and cam means on said dogs engageable by said projections to effect engagement of the dogs when said rotatable member is in its normal position and to effect disengagement of the dogs when said rotatable member is rotated from said position.

11. In an adjustable caster, an upstanding shank having grooves therein, a weight supporting member slidably associated with said shank, a rotatable member carried by said first member, locking dogs pivotally carried by said rotatable member and adapted to engage the grooves of said shank to lock said first member and said shank in various positions of adjustment, said rotatable member having recessed portions including circular recesses, and said dogs being disposed in said portions and having circular tongues coplanar with the rest of the dogs and removably disposed in said circular recesses, said rotatable member also having relatively deep slots in said recessed portions concentric with said shank and underlying said dogs, projections on said first member extending into said slots, springs in said slots urging said rotatable member to normal position relative to said first member, and cam means on said dogs engageable by said projections to effect engagement of the dogs when said rotatable member is in its normal position and to effect disengagement of the dogs when said rotatable member is rotated from said position.

CHARLES R. NALLE.